March 16, 1948. J. R. OLIVER 2,437,753
ROUGHENING MACHINE
Original Filed Nov. 4, 1943 5 Sheets-Sheet 1

Inventor
John R. Oliver
By his Attorney.
Thomas J. Hogan

March 16, 1948.    J. R. OLIVER    2,437,753
ROUGHENING MACHINE
Original Filed Nov. 4, 1943    5 Sheets-Sheet 2

Inventor
John R. Oliver
By his Attorney
Thomas J. Ryan

March 16, 1948. J. R. OLIVER 2,437,753
ROUGHENING MACHINE
Original Filed Nov. 4, 1943 5 Sheets-Sheet 3
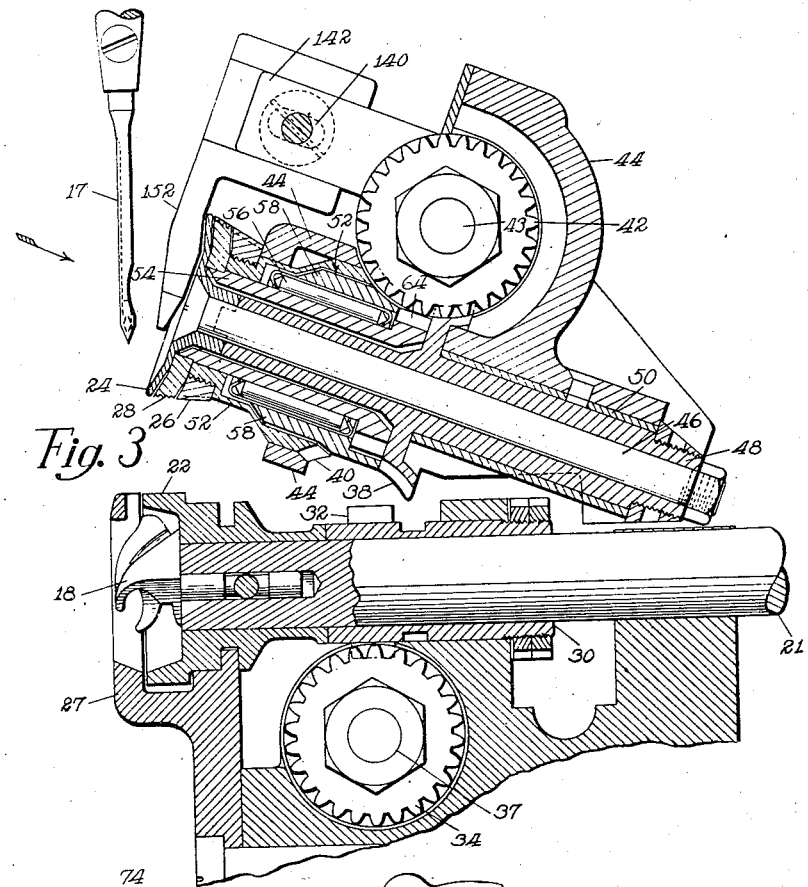
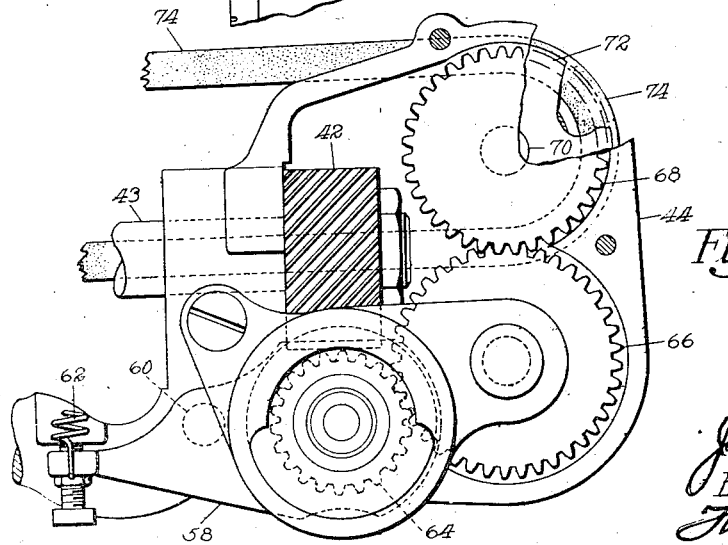
Inventor
John R. Oliver
By his Attorney.
Thomas J. Ryan

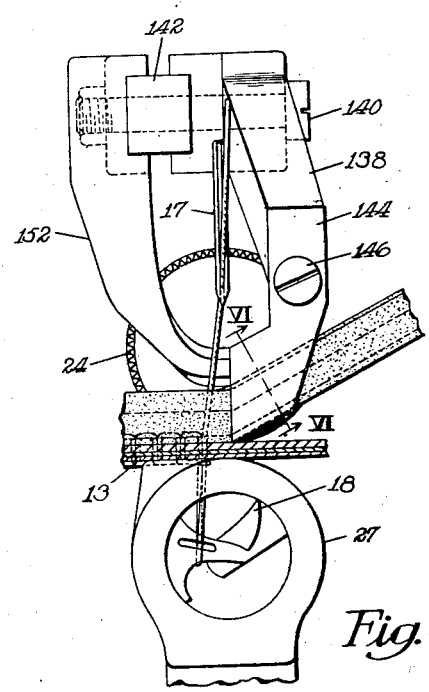
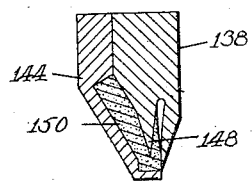
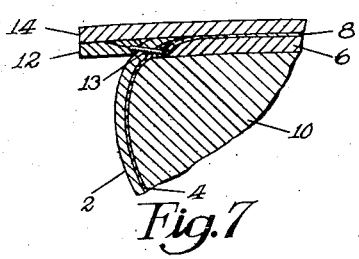
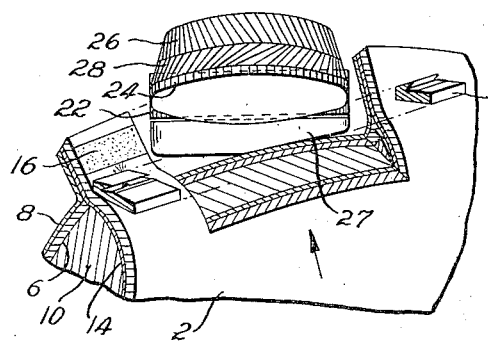

March 16, 1948.   J. R. OLIVER   2,437,753
ROUGHENING MACHINE
Original Filed Nov. 4, 1943   5 Sheets-Sheet 5
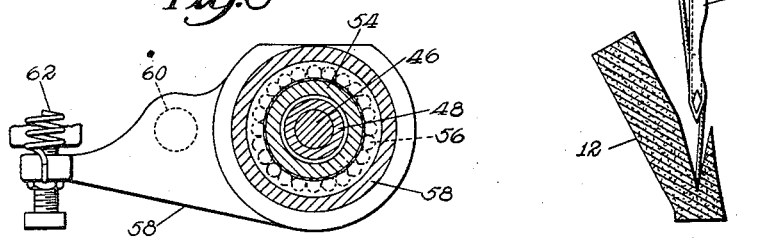
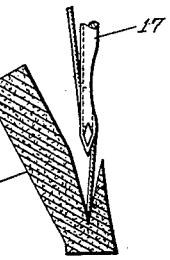
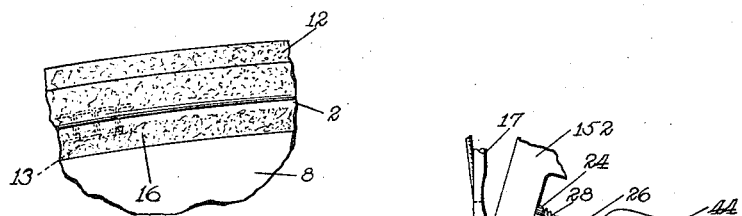
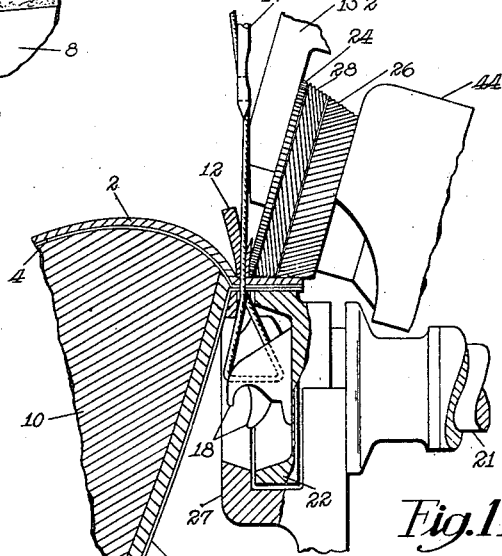
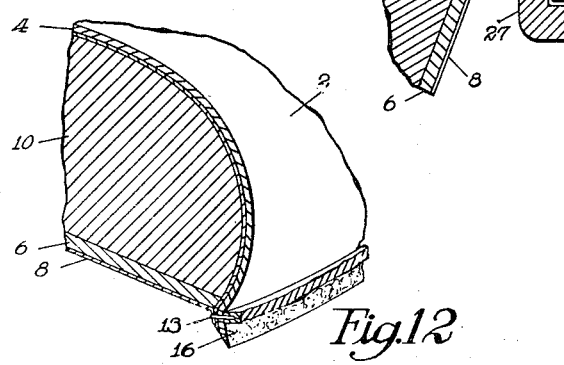
Inventor
John R. Oliver.
By his Attorney.
Thomas J. Ryan.

Patented Mar. 16, 1948

2,437,753

UNITED STATES PATENT OFFICE 2,437,753

ROUGHENING MACHINE

John R. Oliver, Beverly, Mass., assignor to United Shoe Machinery Corporation, Flemington, N. J., a corporation of New Jersey Original application November 4, 1943, Serial No. 508,913. Divided and this application August 7, 1945, Serial No. 609,460

19 Claims. (Cl. 12—1)

The present invention relates to roughening machines and is herein described as embodied in a machine for roughening the lasting margin of a shoe upper which is eventually to be folded inwardly over a midsole or insole to which it is sewed during the construction of the shoe. An example of a machine for sewing the upper to a midsole and for roughening the upper in preparation for cement attachment of an outsole is disclosed in a copending application for United States Letters Patent Serial No. 508,913, filed November 4, 1943, now Patent No. 2,397,619, granted April 2, 1946, of which the present application is a division.

In the use of the machine of the copending application, the parts of a shoe are lasted and sewed while clamped between a pair of work gripping and feeding rolls rotated alternately with each stitching operation to cause the point of operation to progress about the shoe and, during sewing, a welt is attached by the seam inserted. After being sewed, an outsole is secured to the shoe by cement. Accordingly, it is necessary to roughen the parts to which the cement is to be applied in order that the cement may form an effective bond. Conveniently, the lasting margin of the upper is folded inwardly of the midsole and the exposed grain surface of the upper also is roughened so that when the outsole is attached the bond of the cement to the upper renders it unnecessary to rely entirely on the strength of the lasting threads to hold the outsole and welt to the upper.

With roughening machines of prior construction, it is difficult to roughen the lasting allowance along the margin of a shoe upper close to the lasting seam without danger of injury to the stitches. This difficulty is particularly pronounced when the lasting allowance of the upper is trimmed closely to the lasting seam, since close trimming requires also close roughening.

One object of the present invention is to provide a machine in which the work operated upon may be roughened for reception of cement with the formation of a narrow strip of abraded surface close to the exposed threads of a seam connecting the shoe parts while at the same time avoiding any danger of injury to the stitches. Other objects are to improve the operation of prior roughening machines, to so arrange the machine that the grain surface on the upper of a stitchdown type shoe may be roughened within the confines of a strictly limited area and to enable the machine to operate more effectively and easily than prior machines, the work being presented and guided with less effort and with the exercise of less skill on the part of the operator than has been required heretofore with this class of work.

The illustrative machine in which these objects are attained is provided with devices comprising a plurality of work gripping and feeding rolls engaging the work at opposite sides of a coaxially disposed abrading wheel to guard the abrading wheel from accidental engagement with the sewing thread in the seam or from any deviation in roughening action from the desired area.

To assist in guiding the work through the illustrated machine, means for rotating the rolls simultaneously is provided. Preferably, a third feed roll is arranged at the opposite side of the work from the abrading wheel and is connected for rotation with those disposed beside the abrading wheel. To simplify the construction and to provide a compact arrangement, the roughening wheel in the illustrative machine has at its periphery an abrading surface of generally conical shape, and at least one of the coaxial work feeding rolls is similarly shaped.

Although the construction and arrangement of work feeding rolls thus outlined is particularly beneficial in use with a roughening wheel, a further evident advantage is in the use of the machine so equipped to perform a simultaneous feeding and lasting operation where additional devices are employed to fasten the parts so operated upon, as by stitches or cement. The specific disclosure hereinafter made thus includes the stitch forming devices of a combined roughening, lasting and sewing machine.

Other features of the invention consist of certain novel constructions, combinations and arrangements of parts hereinafter described and claimed, the advantages of which will be apparent to those skilled in the art from the following description and the accompanying drawings, in which Fig. 1 is a view in side elevation, partly broken away and in section, of the operating devices in a lasting and sewing machine embodying the features of the present invention;

Fig. 3 is a large scale sectional showing of the lasting or feeding rolls together with the roughening wheel of the improved machine, illustrating their manner of operation upon the work in relation to the positions of the stitch forming devices;

Fig. 4 is a detail view in elevation, as viewed in the direction of the arrow in Fig. 3, of portions of the driving gear arrangements for the feeding rolls and roughening wheel;

Fig. 5 is a view in front elevation on a somewhat reduced scale of the stitch forming devices, work feeding rolls and welt guide in the machine;

Fig. 6 is an enlarged sectional view of the welt guide taken along the line VI—VI of Fig. 5;

Fig. 7 is a sectional view of a portion of a completed shoe the parts of which are lasted and roughened on the machine of the invention;

Fig. 8 is a detail sectional view of the supporting bearing for the roughening wheel, illustrating its manner of adjustment toward and from the work;

Fig. 9 is a detail view on an enlarged scale, indicating the position of the welt and needle after the welt leaves the welt guide and as the stitches are being inserted by the machine;

Fig. 10 is a partial sectional view of a portion of a shoe bottom disclosing the relation of the roughened strip to the seam after being inserted and the excess material trimmed in preparation for the reception of cement;

Fig. 11 is a view in side elevation and partially in section of the work engaging parts and of the stitch forming devices in the improved machine taken while operating upon a portion of the shoe illustrated in Fig. 5;

Fig. 12 is a perspective view of a portion of the shoe after being lasted with the grain surface of the upper roughened for the reception of cement and trimmed but not fully prepared as in Fig. 10 for application of the outsole;

Fig. 14 is a diagrammatic view illustrating the manner in which a lasting operation is performed in the machine.

Figure 1:
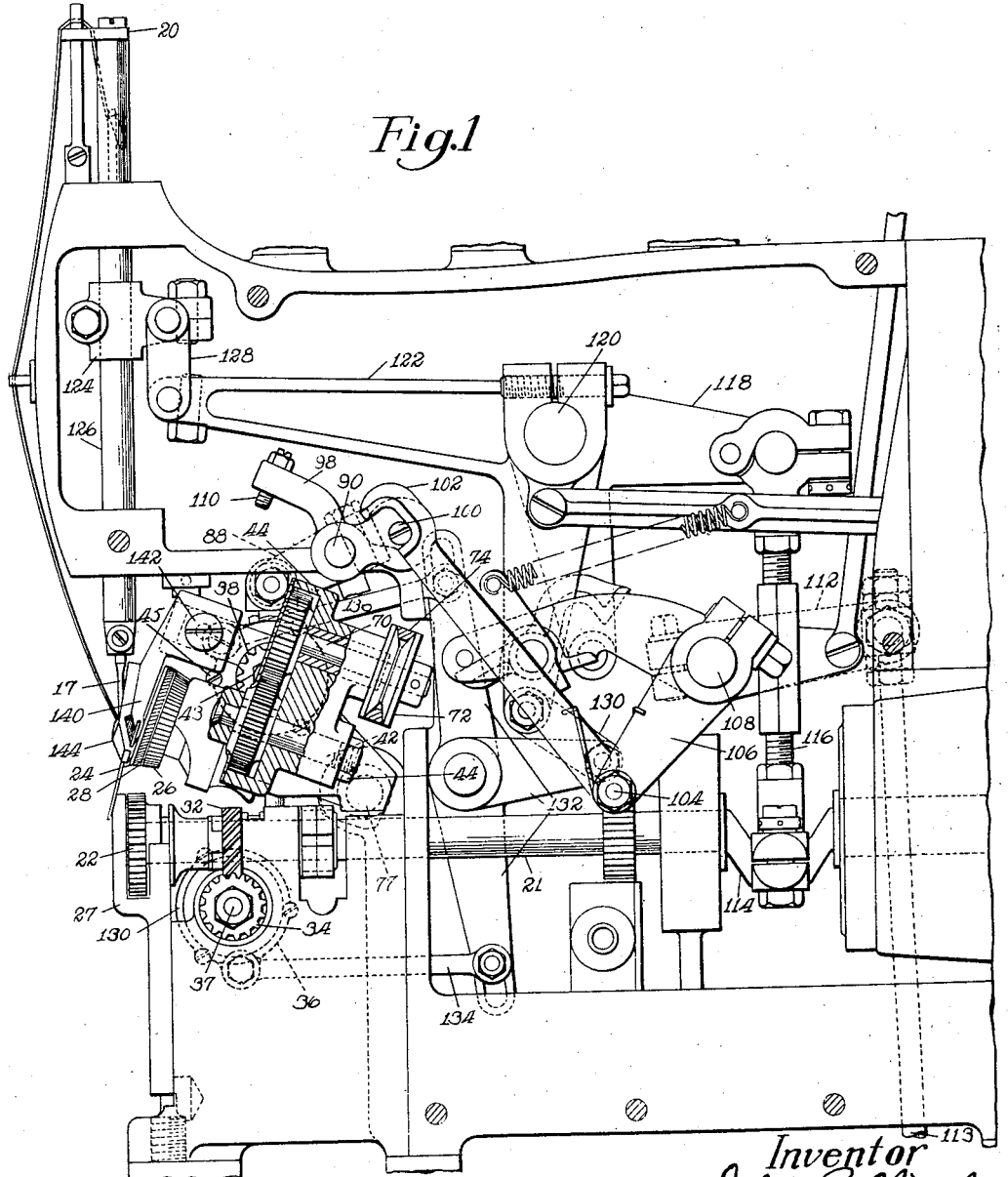
Figure 13:
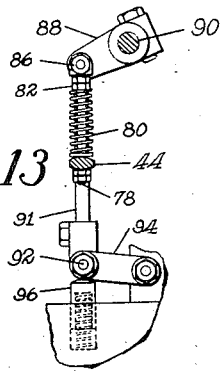
Fig. 13 is a detail view in left side elevation of a set of link connections in the machine.

The shoes operated upon by the illustrated machine are similar to those constructed with the machine of the copending application identified above. As best shown in Figs. 7 and 10 to 12, inclusive, this type of shoe comprises an upper 2 backed by a lining 4, an insole 6 and a thin unchanneled sheet of woven material constituting a midsole 8 superposed upon the insole 6, all the parts being mounted temporarily upon and enclosing a last 10. During sewing, the upper is stretched and carried around the break line of the enclosed last a short distance onto the tread surface of the last. An outsole is then attached by cement with or without the addition of a beveled welt inserted along the crease formed by the outturned margin of the upper and sole. The resulting shoe may be classified as a stitchdown or a welt shoe in which a welt strip, such as is indicated at 12, is led into the lasting seam during sewing. Accordingly, instead of turning the marginal portions of the upper outwardly, as in a stitchdown shoe, the lasting allowances of the upper and attached midsole are trimmed off close to the lasting seam, indicated at 13, with a bevel cut, and the trimmed edges are turned from the line of the seam inwardly along the under surface of the midsole before an outsole is applied to the shoe. When the outsole is applied, the resulting shoe has the construction of that illustrated in Fig. 7, a cement bond being obtained between the welt 12 and the outsole indicated at 14.

In order to form a more durable union between the outsole 14, the welt 12 and the upper 2 of the shoe illustrated in Fig. 7, it is desirable to avoid trimming the lasting allowances of the upper and midsole too close to the lasting seam connecting the welt and upper. It is preferable to trim the upper and midsole with an allowance sufficient in width when folded over inwardly of the midsole to provide a narrow strip of surface 16 on the upper to which the outsole attaching cement may be applied. Before the cement can be applied to the surface 16 of the lasting allowance, the upper preferably is suitably prepared and roughened, since the grain or finished surface of the leather in the upper is exposed. In roughening the lasting and cementing allowance of the upper, extreme care must be taken to avoid abrading or otherwise injuring the threads of the lasting seam, and because the cementing allowance is comparatively narrow in width and of flexible nature there are numerous practical difficulties in this operation.

In the machine to which the present invention is applied, the work engaging parts are constructed and arranged to form, simultaneously with the sewing operation, the roughened strip 16 on the grain surface of the upper close to the line of stitches inserted. For this purpose, the illustrated machine is provided with work guiding and feeding devices to prevent the sewing thread from coming into engagement with the roughening means and to insure that the operation of the roughening means will be guided accurately in close proximity to the point where the stitches of the seam are inserted.

The stitch forming devices of the illustrated machine comprise a straight eye-pointed needle 17, a loop taker 18 and a take-up 20, all actuated by a main sewing shaft 21 of the same construction and mode of operation as in the machine of United States Letters Patent No. 1,864,510, granted June 21, 1932, an application of Bernard T. Leveque. In the machine of both the patent and application referred to, the work is gripped and fed by a pair of opposed upper tensioning and work engaging rolls, one at either side of the work and termed the "top or upper engaging" and "lower or support" rolls. To grip and feed the work past the point of sewing operations, the present illustrated machine is provided with three work engaging rolls 22, 24 and 26. The rolls 24 and 26 rotate about the same axis, have conical work engaging surfaces and together perform the upper tensioning functions of the single upper engaging roll in the patented machine, the shoe being held in contact with a work support 27. The upper engaging rolls 24 and 26 are rotated simultaneously and intermittently while engaging the work, the stitches being inserted alternately with the feeding movements of the rolls. The lower support roll 22 also is rotated simultaneously with the upper engaging rolls 24 and 26 by mechanism more fully illustrated and described in the Leveque patent.

To cause the rolls 24 and 26 in tensioning the upper to produce an effective lasting operation, the front face of the work support cooperates with the feed rolls to exert a pull on the upper transversely to the direction of feed as illustrated in Figs. 11 and 14, in a manner similar to that set forth in Patents 1,864,510 and 2,397,619 above identified.

To roughen the strip 16 on the grain surface along the lasting allowance of the shoe upper 2 which extends beyond the seam line and which is gripped by the work engaging and feeding rolls in the illustrated embodiment of the present invention, the rolls 24 and 26 are spaced axially a short distance apart and there is interposed between them a rotatable abrading wheel 28 having a generally conical peripheral surface formed in the usual way with spaced rows of teeth. The adjacent peripheral surfaces of both rolls 24 and 26 and of the abrading wheel are arranged substantially coaxially with each other and form an unbroken generally conical contour, the rolls and wheel being nested together in compact relationship. The roll 24 is so mounted that the needle 17 operates diametrically across its outer face, thus serving as a work guide and thread guard for the abrading wheel. The guide roll 24 is provided with a relatively narrow peripheral edge surface so that the abrading wheel 28 may act close to the seam line and at the same time will be guarded from accidental contact with the thread during sewing. The roll 26 is spaced a short distance to the rear of the roll 24 and assists in gathering the fullness of the outflanged allowance of the upper and distributing it evenly along the seam. Thus, the abrading wheel 28 acts along a portion of the upper while being tensioned by the feeding rolls, which portion is disposed in a plane at an angle to the bottom of the last, providing an opportunity for uniform control of the roughening operation.

The mountings and means for driving the feed rolls and abrading wheel are best illustrated in Fig. 3 and enable the needle to operate across an end face diametrically of the substantially coaxial feeding rolls and abrading wheel along a path forming an obtuse angle with the axis about which the rolls and wheel rotate. The lower support roll 22 is rotatably mounted upon the forward end of the main sewing shaft 21 of the machine and is driven by a sleeve 30 on which are formed helical gear teeth 32 meshing with a helical gear 34 driven intermittently by mechanism including a one-way Horton clutch, or ratchet, 36 (see Fig. 1) on a shaft 37. The guide roll 24 and the upper gathering roll 26 are similarly driven by helical gears 38 and 40 to which they are connected respectively. The gears 38 and 40 are spaced axially to mesh at separate locations about the circumference of a single intermittently rotated helical driving gear 42 secured to a shaft rotatably mounted in a pivoted support member 44, the intermittent feeding movement being imparted by a one-way Horton clutch 45 on the shaft 43.

The guide roll 24 has an inclined central spindle 46 in the form of a bolt for clamping the roll 24 to a sleeve 48 rotatably mounted in a bushing 50 in the support member 44 concentrically with the sleeve 30. The guide roll is keyed to the forward end of the sleeve 48 and, along its central portion, the sleeve is provided with a flange forming the helical gear 38 meshing with the gear 42 along those tooth portions of the gear 42 approximately beneath the center of the shaft 43.

The upper gathering feed roll 26 is of washer-like configuration threaded within a central opening to a sleeve 52 rotatably mounted in bearing surfaces of the support member 44. At its rearward end, the sleeve 52 has an enlargement forming the helical gear 40 meshing with the intermittently driven gear 42 along those tooth portions of the gear which are disposed with an angular displacement of approximately 45° from those engaged by the helical gear 38.

To drive the abrading wheel 28 continuously while the feed rolls act intermittently, the abrading wheel is secured to the outer end of a sleeve 54 surrounding the forward end of the sleeve 48, the internal diameter of the sleeve 54 being sufficient to enable slight relative movement between the sleeve 54 and the sleeve 44 transversely to their axes, the purpose of which will be explained hereinafter. Surrounding the abrading wheel sleeve 54 is a needle-type roller bearing 56 supported within bearing surfaces of a tubular seat at one end of a mounting lever 58 (see Fig. 4) fulcrumed by means of an integrally formed stud 60 which enters an opening in the support member 44. The left end of the mounting lever 58 is forced yieldingly upwardly by a tension spring 62 connected between the lever and a pin extending laterally from the support member 44. The arrangement is such that the upward force of the spring 62 forces the abrading wheel yieldingly downwardly to engage the surface of the work operated upon along a line at right angles to the seam connecting the upper engaging portions of the rolls 24 and 26 and the point of sewing operations. Thus, all the work engaging devices are located in alinement effectively to operate within a small area on the work with the least possible tendency to exert forces which must be overcome by the operator in presenting the shoe to and guiding it in the machine. The work is securely held in the grip of the feed rolls acting at opposite sides of the abrading wheel to prevent movement of the work by the abrading wheel as a result of its reaction on the work.

Figure 2:
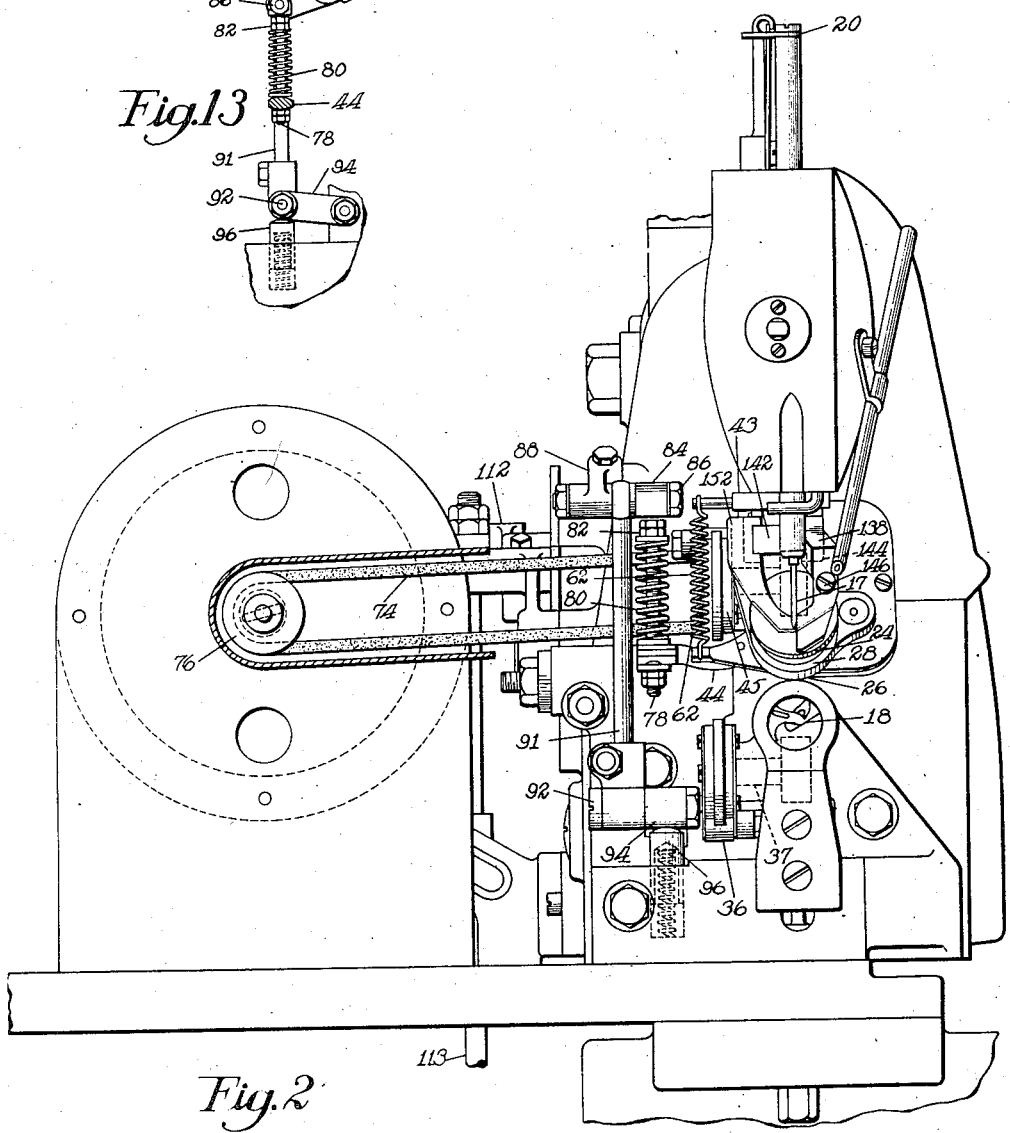
Fig. 2 is a view in front elevation and partly in section of the same portions of the machine illustrated in Fig. 1.

To drive the abrading wheel sleeve 54, the rearward end of the sleeve is formed with a spur gear 64 of sufficiently small external diameter to escape contact with the feed roll driving gear 42. Meshing with the spur gear 64 at the right-hand side of the axis of the sleeve 54 is an idler gear 66 rotatable in the support member 44 (see Figs. 1 and 4) which idler gear in turn meshes with a driving gear 68 fixed to the forward end of a spindle 70. The rearward end of the spindle 70 has secured to it a pulley 72 about which passes a V-belt 74 surrounding a motor driven pulley 76 (Fig. 2) at the left side of the machine. The motor pulley 76 is rotated continuously at a sufficiently high speed to cause the strip of material engaged by the abrading wheel to be roughened thoroughly and to a sufficient depth below the grain surface of the upper to provide a firm grip for the cement.

It will be noted that, as in the patented machine, the present work gripping and feeding rolls are rotated intermittently and only during the times when the needle is disengaged from the work. The abrading wheel of the present machine, however, is continuously rotated and, due to its yielding mounting in the support member, has a tendency to produce an increased roughening effect while the shoe is stationary, cutting into the upper below the grain surface engaged by the top rolls 24 and 26 at positions on the upper directly in line with the points of engagement on the upper of the top rolls and opposite the point of needle penetration. Thus, the intermittent feeding movement on the work produces a varied degree of roughening along the area operated upon. A varied roughening action causes a desirable effect, particularly when applied close to the stitches of a seam, since it increases the grip provided for the cement at selected locations with relation to the inserted stitches, thereby tending to equalize the strains in the cemented materials produced by the tension of the thread in the stitches and also tending to increase the flexibility of the resulting shoe in a manner more fully set forth in United States Letters Patent No. 2,013,341, granted September 3, 1935, upon an application filed in the name of Karl Engel.

Another advantage of the variations in degree of roughening is a result of a general improvement in the quality of the bond resulting when cement is applied to the roughened strip 16. In certain types of material the surfaces of which are relatively hard and inflexible, a light abrasion is sufficient to insure a reliable bond with cement, whereas, with softer and more flexible materials, it is desirable to prepare the surfaces by abrading more deeply into the substance of the material, thus producing elongated free fibers, the roots of which are morely deeply anchored than those at the surface of the material. If the free fibers are too long, however, it is difficult to obtain a firm foundation for the cement on the main body of the material so that an insecure bond results. When different types of work are operated upon in the usual roughening machine, it is the practice, therefore, to adjust the machine manually for the particular type of material.

In the machine of the present invention, variation in depth of abrasion occurs automatically along the roughened strip 16, and a secure bond is insured for all types of material within a given range of quality since both deep and shallow abrasion of the surface is produced alternately. The shallow areas of abrasion will cause no substantial weakening in the strength of the material such as would be produced by a strip of roughened material with uniform and relatively deep abrasion. Also, under proper adjustment, the abrading wheel may roughen the material below the surfaces engaged by the rolls 24 and 26 only while the work is held stationary between feeding movements. With such adjustment, separate roughened areas will be produced to which the cement will adhere without bonding with the un-roughened areas between. When thus cemented, the completed shoe will have greater flexibility and the cement will not have the opportunity to crack or to become disengaged from the parts as where the upper is uniformly roughened along a continuous strip.

For convenience in applying the shoe to the machine and removing the shoe after the operations are completed the supporting member 44 is shiftable on its pivot 77 to carry the feed rolls and abrading wheel, mounted thereon, toward and from the lower feed roll 22. For actuating the upper engaging rolls toward the supporting roll to grip the work, the support member 44 has a laterally extending arm formed with a perforation receiving loosely a threaded rod 78 coiled about which is a compression spring 80 acting at its lower end against the arm of the support member 44 and at its upper end against a check nut 82 on the rod 78. The upper end of the rod 78 also is threaded into a perforated block 84 pivotally mounted on a stud 86 which passes through the perforation in the block 84 and is secured to an arm 88 clamped to one end of a horizontal rockshaft 90 rotatable in the machine frame. When the rockshaft 90 is rotated, the arm 88 and the threaded rod 78 about which is coiled the compression spring 80 act as a toggle to depress the support member 44 and lock the rolls 24 and 26 yieldingly in engagement with the work. During movement of the rockshaft 90, the arm 88 reaches a position of alinement with the rod 78, and the spring 80 is compressed to force the feed rolls 24 and 26 against the work. Before engaging the work, the abrading wheel 28 which projects slightly below the adjacent edges of the feed rolls 24 and 26 first engages the work and, during continued downward movement of the support member, the abrading wheel causes the spring 62 connected to the mounting lever 58 for the abrading wheel to yield, thus providing a yielding engagement of the abrading wheel with the work, the toggle spring 80 being stronger than the spring 62 and, therefore, overcoming the force of the spring 62. After the arm 88 moves beyond a position of alinement with the rod 78, the spring 80 serves to hold the rolls in work gripping position until the rockshaft 90 is positively operated in the opposite direction. When the rockshaft is rotated in the opposite direction to unlock and raise the gripping and feeding rolls and the abrading wheel, the support member 44 is maintained in its raised position by the action of a link 91 pivotally connected to the stud 86 and to a stud 92 at the forward end of a radius arm 94 carried by a pivot on the machine frame. The lower end of the radius arm 94 is urged yieldingly upwardly by a spring pressed plunger 96 slidably mounted in the machine frame beneath the radius arm. Thus, the abrading wheel and adjacent upper feed rolls may be yieldingly pressed against or forced away from the work as a unit and, when disengaged from the work, the condition of the surface of the upper may readily be examined by the operator without removing the work from operative position on the support roll 22.

The shaft 90 is rocked by mechanism similar to that for raising and lowering the upper feed roll in the Leveque patent above referred to. This mechanism briefly comprises a three-arm member 98 (see Fig. 1) one arm of which carries a projecting screw 100 acted upon by a hook 102 pivoted by means of a bolt 104 on the end of an arm 106 secured to a treadle controlled rockshaft 108. The other arms of the three-arm member 98 are provided with set screws, one of which is indicated at 110, arranged to contact with stationary portions of the frame to limit rotational movement of the rockshaft 90. The treadle controlled rockshaft 108 is actuated to shift the position of the hook 102 by an arm 112 secured to the outer end of the rockshaft 108 and a treadle actuated rod 113 extending downwardly from the left side of the machine and connected to the arm 112. Movement of the treadle controlled rockshaft 108 causes the feeding rolls to grip the work and also connects the actuating mechanism for the feeding rolls with the main sewing shaft 21.

To connect the actuating mechanism for the work gripping and feeding rolls with the main sewing shaft 21, the sewing shaft is formed with a crank portion 114 surrounded by a bearing at one end of a connecting rod 116, the other end of which is connected to a bell crank 118 rotatably mounted on a fixed stud 120. Also rotatable on the stud 120 is a needle actuating bell crank 122 between which and a clamp collar 124 on a needle supporting bar 126 is a short link 128. Also connected to the needle actuating lever 122 is a pair of short links 130, one beside the other, operatively connecting a pair of similar but oppositely disposed bell cranks 132 for the feed roll actuating mechanism. To oppositely disposed similar arms on the bell cranks 132 there are connected through links 134 and 136, respectively, the Horton clutches 36 and 45 acting simultaneously to drive the shafts 37 and 43 on which the driving gears for the feed rolls are mounted. For a complete description of the construction and mode of operation of this mechanism, reference may be had to the Leveque patent.

The present machine is equipped with a guide for directing a welt into the seam formed by the stitch forming device. This welt guide is best shown in Figs. 1, 2, 5 and 6 and consists in a base block 138 secured by a bolt 140 to a forwardly extending arm 142 of the support member 44 and a cover plate 144 fastened to the base block 138 by a screw 146. Between the base block 138 and the cover plate 144 there is formed a welt receiving passage arranged with a downwardly extending rib 148 in alinement with the needle to enter into an angular cut provided in the flesh side of the welt indicated at 150. The rib 148 raises a flap formed by the cut in the welt from the main body of the welt so that the needle 17 during its work penetrating stroke may strike into the root of the cut in the welt and emerge from the lower edge of the welt when penetrating the parts of the shoe operated upon. In other respects, the operation of the welt guide directing the welt toward the point of sewing operation is the same as that in the machine of United States Letters Patent No. 2,272,065, granted February 3, 1942, on application of Edward W. Koloske and Leonard S. Curtin.

To provide additional means for guarding the sewing thread from the peripheral work engaging surfaces of the feed rolls and roughening wheel which are formed with pointed teeth or ridges and to strengthen the support of the welt guide in the machine, the bolt 140 passes through a brace member 152 at the opposite side of the support arm 142 having a downwardly curved horizontally bent lower end contacting with a side surface of the supporting block 138 of the welt guide. The brace member also assists in locating the welt properly and preventing its displacement from the work between the time the needle penetrates the work and the time each stitch is set.

Although the invention has been illustrated as embodied in a combined roughening and sewing machine, the features of the invention are readily applicable to machines intended for roughening operations only, by omitting the stitch forming devices of the machine. When the stitch forming devices are omitted or rendered inoperative, a simple roughening operation may be performed on a previously lasted shoe upon presenting the shoe to the feeding and lasting devices. When the shoe is lasted and sewed before the roughening operation is performed, the shoe may easily be guided to prevent injury to the stitches in the same manner as when the stitches are inserted simultaneously with the roughening or, if desired, the operation of the feeding rolls may be employed to last and secure the shoe parts together by pressure-sensitive cement. In any case, the guarding action of the feeding rolls will successfully prevent roughening of the shoe upper outside the confines of the narrow strip within which the roughening is intended to be limited.

The nature and scope of the invention having been indicated and a particular embodiment having been specifically described, what is claimed is:

1. A roughening machine having, in combination, a rotary wheel formed about its periphery to abrade the surface of the work operated upon for the reception of cement, and means for feeding the work past the abrading wheel, comprising rolls mounted substantially coaxially with and disposed one on either side of the abrading wheel.

2. A roughening machine having, in combination, a rotary wheel formed about its periphery to abrade the surface of the work operated upon for the reception of cement, means for feeding the work past the abrading wheel, comprising rolls mounted substantially coaxially with and disposed one on either side of the abrading wheel, and means for rotating the feed rolls simultaneously to carry the work past the point of engagement with the abrading wheel.

3. A roughening machine having, in combination, a rotary wheel formed about its periphery to abrade the surface of the work operated upon for the reception of cement, means for feeding the work past the abrading wheel, comprising rolls mounted substantially coaxially with and disposed one on either side of the abrading wheel, a feed roll acting at the side of the work opposite the abrading wheel, and means for rotating all the feed rolls simultaneously.

4. A roughening machine having, in combination, a rotary wheel formed about its periphery to abrade the surface of the work operated upon for the reception of cement, means for feeding the work past the abrading wheel, comprising rolls mounted substantially coaxially with and disposed one on either side of the abrading wheel, and means for rotating the abrading wheel continuously and for rotating the feed rolls intermittently.

5. A machine for operating upon shoes having, in combination, an upper engaging roll, a work support between which and the peripheral surface of the roll an outturned upper and a sole member of a shoe are gripped, and an abrading wheel mounted to turn on an axis substantially coaxial with the roll and arranged to roughen a narrow strip along that portion of the grain surface on the upper which is gripped between the roll and the work support for the reception of cement.

6. A roughening machine having, in combination, a rotating wheel having its periphery formed with a conical surface to abrade the work operated upon for the reception of cement, and means for feeding the work past the abrading wheel, comprising a roll the periphery of which at the point of contact with the work is substantially parallel to that part of the conical surface on the abrading wheel engaging the work and which is mounted substantially coaxially with the abrading wheel.

7. A roughening machine having, in combination, a rotary wheel formed about its periphery to abrade the surface of the work operated upon for the reception of cement, and means for feeding the work past the abrading wheel comprising rolls disposed at opposite sides of the work, and a shiftable member on which one of the rolls at the side of the work with the wheel is mounted arranged for movement toward and from the other roll to enable removal and replacement of the work in the machine, and means for causing the wheel to be disengaged from the work whenever the shiftable member is actuated to move the roll mounted thereon away from the work.

8. A roughening machine having, in combination, a rotary wheel formed about its periphery to abrade the surface of the work operated upon for the reception of cement, means for feeding the work past the abrading wheel comprising rolls disposed at opposite sides of the work, and a shiftable member on which one of the rolls and the abrading wheel are mounted, arranged for movement toward and from the other roll to enable removal and replacement of the work in the machine.

9. A roughening machine having, in combination, a rotary wheel formed about its periphery to abrade the surface of the work operated upon for the reception of cement, means for feeding the work past the abrading wheel comprising rolls disposed at opposite sides of the work, a shiftable member on which one of the rolls and the wheel are mounted, means acting yieldingly on the shiftable member to urge the wheel against the work, and treadle control means for moving the shiftable member to disengage the abrading wheel and the roll mounted thereon from the work while removing or replacing the work.

10. A roughening machine having, in combination, a rotary wheel formed about its periphery to abrade the surface of the work operated upon for the reception of cement, means for feeding the work past the abrading wheel comprising rolls disposed at opposite sides of the work, a shiftable member on which one of the work feeding rolls and the abrading wheel are mounted, means acting yieldingly on the shiftable member to urge the abrading wheel against the work, treadle controlled means for moving the shiftable member to disengage the abrading wheel from the work while removing or replacing the work, and a yielding mounting on the shiftable member for the abrading wheel to enable the abrading wheel to roughen the work below the surface engaged by the work feeding roll mounted on the shiftable member.

11. A roughening machine having, in combination, work gripping and feeding rolls for engaging the work while being operated upon, a rotating wheel having its periphery formed with a surface to abrade the work sufficiently for the reception of cement, said wheel being mounted substantially coaxially with and between two of said rolls, concentric sleeves on which the rolls are mounted, helical driven gears on the respective sleeves, a single helical driving gear for the driven gears, and a spur gear between the driven gears for driving the abrading wheel separately from the feeding rolls.

12. A roughening machine having, in combination, work gripping and feeding rolls for engaging the work while being operated upon, a pivoted support member for certain of the feeding rolls for enabling the rolls to grip and release the work, a rotary wheel on the support having its periphery formed with a surface to abrade the work sufficiently for the reception of cement, and means on the support for driving the feed rolls and the abrading wheel separately.

13. A roughening machine having, in combination, work gripping and feeding rolls for engaging the work while being operated upon, a pivoted support member for certain of the feeding rolls for enabling the rolls to grip and release the work, a rotary wheel on the support having its periphery formed with a surface to abrade the work sufficiently for the reception of cement, mechanism on the support for intermittently rotating the feed rolls, and a continuously rotating member on the support for driving the abrading wheel.

14. A machine for operating upon shoes having, in combination, shoe supporting and feeding means including upper tensioning rolls between which the upper of a shoe is gripped, and an abrading wheel acting on the upper in proximity to the grip of the tensioning rolls to roughen the upper.

15. A machine for operating upon shoes, having lasting means including an upper engaging roll, in combination with an abrading wheel acting on the upper of the shoe in proximity to the point of engagement of the roll with the upper to roughen the upper for the reception of cement.

16. A machine for operating upon shoes, having lasting means, in combination with an abrading device acting on the upper in proximity to the point of engagement of the lasting means with the upper to roughen the upper for the reception of cement.

17. A machine for operating upon shoes, having upper tensioning and feeding means, in combination with an abrading wheel acting along a portion of the upper tensioned by the tensioning and feeding means to roughen the upper for the reception of cement.

18. A machine for operating upon shoes, having upper tensioning means, in combination with an abrading device acting along a portion of the upper tensioned by the tensioning means to roughen the upper for the reception of cement.

19. A machine for operating upon shoes, having means for working the marginal portion of an upper into lasted relation to the sole of a shoe upon the last, in combination with an abrading device acting along a portion of the upper while disposed in a plane at an angle to the bottom of the last to roughen the upper for the reception of cement.

JOHN R. OLIVER.

REFERENCES CITED

The following references are of record in the file of this patent:

UNITED STATES PATENTS

| Number | Name | Date |
| --- | --- | --- |
| 2,328,609 | Brostrom | Sept. 7, 1943 |